United States Patent [19]
Paul et al.

[11] Patent Number: 4,892,067
[45] Date of Patent: Jan. 9, 1990

[54] VALVE CONTROL SYSTEM FOR ENGINES

[76] Inventors: Marius A. Paul; Ana Paul; Cristiana J. Rotkoski, all of 1100 E. Orangethorpe Ave., Ste. 140, Anaheim, Calif. 92801

[21] Appl. No.: 223,436

[22] Filed: Jul. 25, 1988

[51] Int. Cl.⁴ .............................. F01L 9/02; F01L 1/34
[52] U.S. Cl. ................................ 123/90.12; 123/90.16
[58] Field of Search .............. 123/90.12, 90.15, 90.16, 123/90.27, 90.4, 90.46, 90.55, 90.57, 308, 310, 315, 432

[56] References Cited

U.S. PATENT DOCUMENTS

| | | | |
|---|---|---|---|
| 3,903,849 | 9/1975 | List et al. | 123/308 |
| 4,112,884 | 9/1978 | Tominaga | 123/90.16 |
| 4,408,580 | 10/1983 | Kosuda et al. | 123/90.16 |
| 4,421,081 | 12/1983 | Nakamura et al. | 123/310 |
| 4,466,390 | 8/1984 | Babitzka et al. | 123/90.12 |
| 4,633,844 | 1/1987 | Okimoto | 123/432 |
| 4,696,265 | 9/1987 | Nohira | 123/90.12 |
| 4,779,589 | 10/1988 | Matsuura et al. | 123/323 |

FOREIGN PATENT DOCUMENTS 0148210  9/1983  Japan ............................. 123/90.55

*Primary Examiner*—Charles J. Myhre
*Assistant Examiner*—Weilun Lo
*Attorney, Agent, or Firm*—Bielen and Peterson

[57] ABSTRACT

A valve control system particularly adapted to engines having four valves per engine cylinder, the valve system including an electronically controlled valve lifter that operates in conjunction with the actuating cam enabling the effective timing and displacement of the valve to be varied within certain ranges accordance with engine operating conditions and demand under the electronic control of a microprocessor.

16 Claims, 3 Drawing Sheets

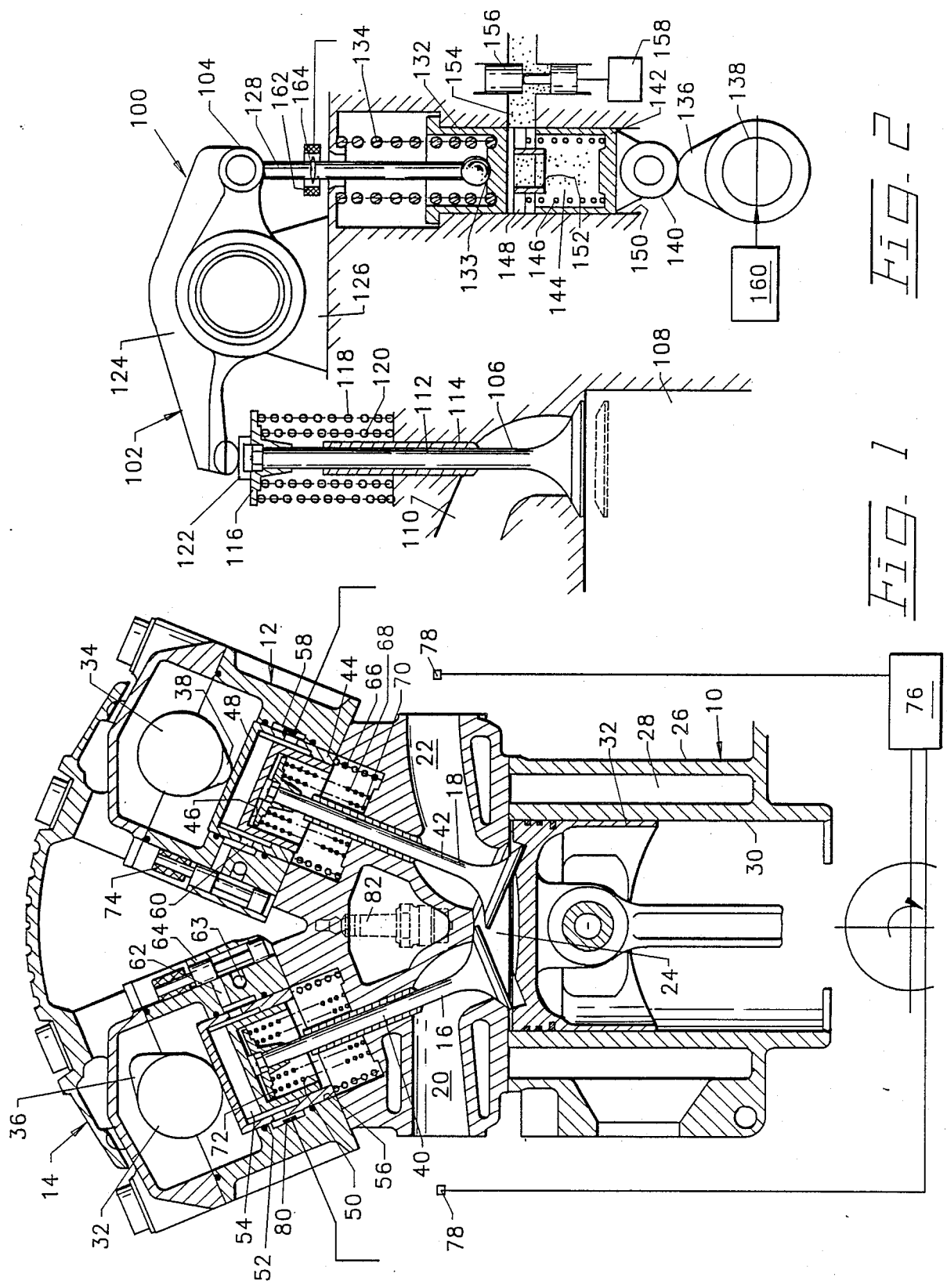

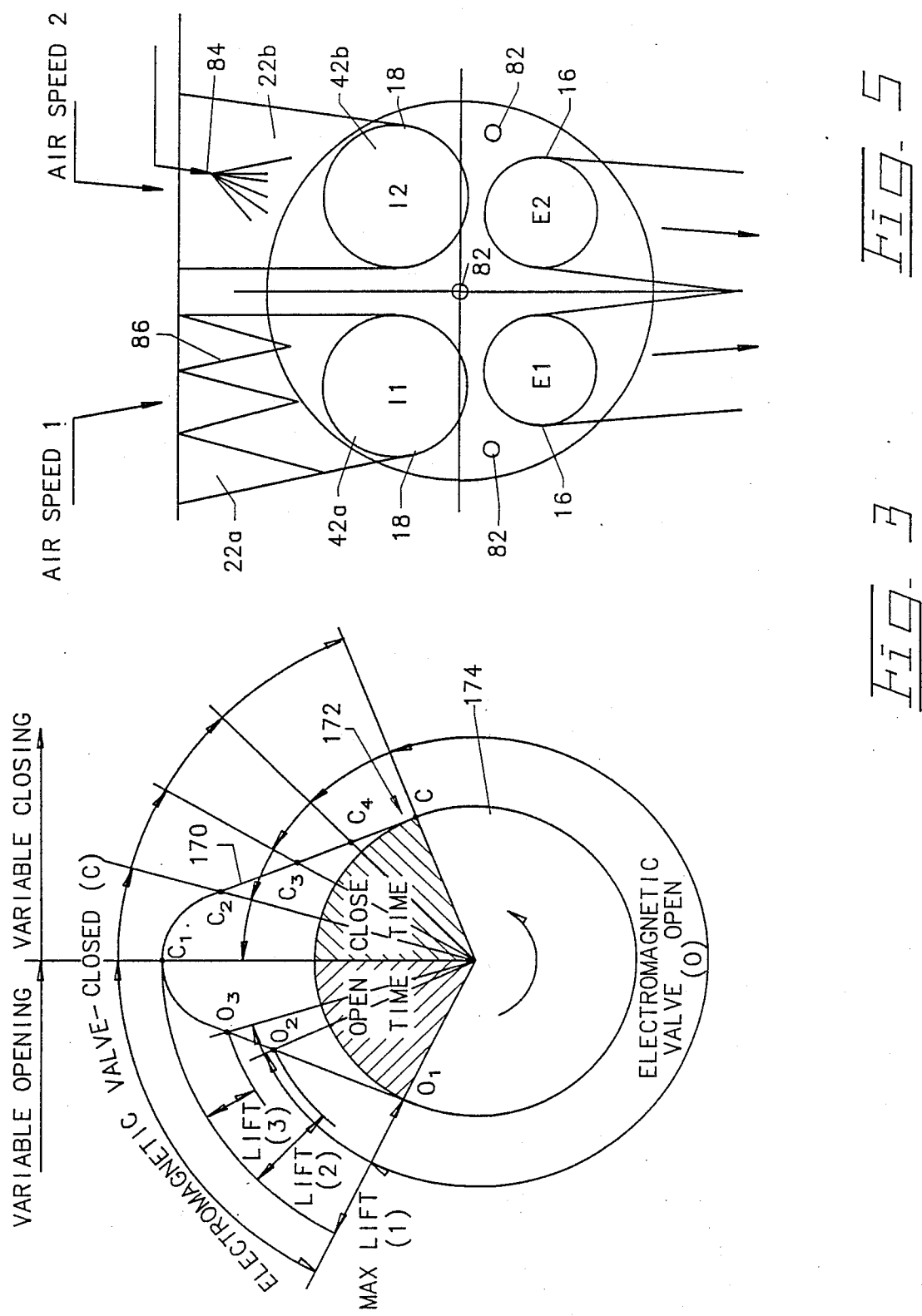

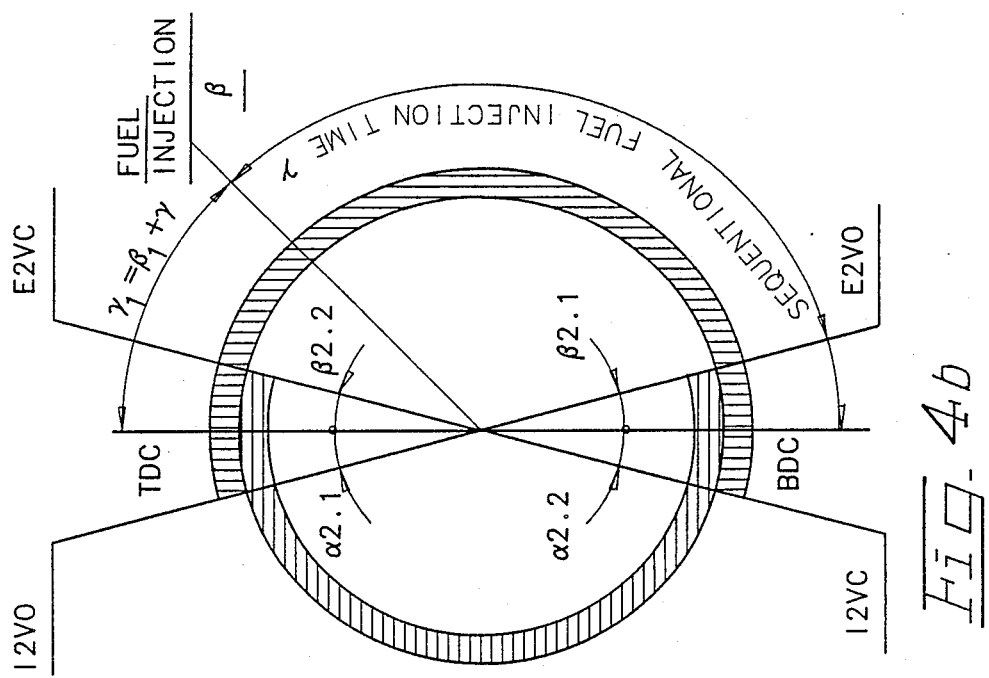
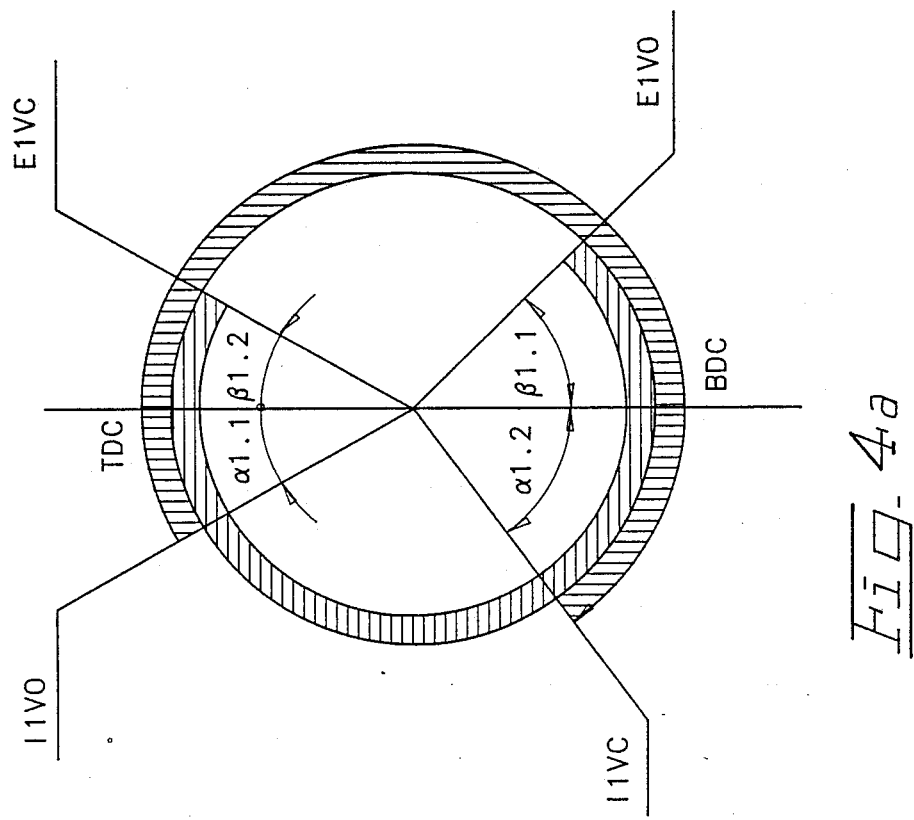

VALVE CONTROL SYSTEM FOR ENGINES

BACKGROUND OF THE INVENTION

This invention relates to improvements in the means regulating the air intake and the exhaust gas emission from reciprocal, internal combustion engines. Specifically, the improvements relate to the modification in the design of valve systems for recently introduced quad-engines, which are multi-cylinder engines in which each cylinder is serviced by four valves. While the improvements herein have application to engines including more than four valves as have been proposed in certain Japanese designs, the four valve engine provides the necessary flexibility to incorporate the design modifications herein proposed.

The four valve engine, with two intake and two exhaust valves, was developed to increase the available surface area for rapid intake and exhaust of maximized volumes of air and combustion gases to and from the combustion chamber during high speed operation of compact, turbo-charged engines having a minimum number of cylinders. The popular quad-four engine is designed as a four cylinder engine with each cylinder serviced by four valves and designed for an optimum power output matching that of a comparable V—8 engine. While the gas flow design of a four valve engine provides maximum power at high operating speeds, it has been found that the developed torque at low r.p.m. is disappointing. At low r.p.m. the cylinders tend to be overcharged with air and overevacuated resulting in fuel loss and inadequate combustion of excessively lean fuel-air mixtures. When the four-valve per cylinder engine is compared with two-valve per cylinder engine, the two-valve engine has exhibited superior performance at low engine operating speeds, developing better torque and mileage than that of the state of the art quad-engine.

In developing a reciprocal engine suitable for automotive use with low emissions and high efficiency the engine must satisfy a customer who dreams of sporting excellence coupled with the necessity of city driveability. To achieve this dream the engine must have an optimized torque that develops power not only during high speed freeway operation, but during the day to day., stop and go traffic of the urban commute.

The solutions provided by this invention enable a four cycle, cam operated, four-valve per cylinder engine to continuously adjust the air intake and exhaust flow through the engine in response to electronically sensed operating conditions. Using the means devised, the four-valve engine can be operated with each valve operating independently according to timing and displacement such that the optimized gas flow conditions match the vehicle road conditions and driver demand. By use of the particular components selected to accomplish the variable character of valve operation, the response to electronically sensed operating conditions can be immediate and accomplished by use of component having low inertia and high-speed, electronic actuation.

The improved gas flow means devised and described in this invention can be incorporated into a new engine or can be adapted for use in existing engines by incorporation in a replacement head. The means devised can be adapted to two-cycle engines and other cam operated engines, where variations in the effective amplitude and period of the cam are desired.

SUMMARY OF THE INVENTION

The improved means for regulating air and gas flow through a cam-operated, multi-valve engine which is the subject of this invention is particularly designed for application in engines having multiple intake and multiple exhaust valves for each cylinder.

In particular, the invention comprises an electro-hydraulic valve lifter assembly which allows the amplitude and period of fixed cams to be electronically varied to effectively vary the displacement and timing of the valves independently.

In an engine arrangement in which each cylinder is equipped with four valves, the valves are cam operated and fixed in duration of actuation and degree of displacement. In such a fixed system, engine operation is optimized at a specific narrow range of speed and torque. The modern quad- our engines are designed for optimized operation at the upper end o: their performance. However, in slow speed city driving, the overly aspirated engine can suffer from wasted fuel and loss of torque. Use of the innovative valve system of this invention, enables the valves to reduce their capacity to pass air and gas through the engine, thereby providing the necessary impedance for effective operation at extremely low speed. In such operation, one pair of intake and exhaust valves can, if desired, be rendered wholly inoperative and the other, if desired, reduced in its displacement and duration. Between this low speed or idle operation, and high speed performance where both valves are fully operational, valve adjustment can occur according to the actual conditions encountered by the vehicle operation.

While substantially improved performance can be obtained with the hydraulic control mechanism applied to two of the four valves, for maximized control of the engine air and gas systems, it is preferred that each of the &our valves in the four-valve engine be equipped with the hydraulically controlled tappet system such that each valve can be independently regulated according to demand.

State of the art automobiles are currently being equipped with electronic monitoring systems for sensing a variety of conditions key to efficient operation of a vehicle. For example, in certain systems ten sensors are used including sensors of temperatures, pressure, air flow, throttle conditions, crank shaft location, and knock. These sensed conditions are evaluated by a microprocessor system which in turn provides the control for regulation of various engine operations such as fuel quantity and timing, spark ignition, and in some systems, air supply. In the system proposed, the state of the art microprocessor sensing and control system is additionally utilized to control the actuation of the valves in the four-valve system. With the increased ability to control the air intake and combustion gas exhaust flows, emission control and fuel saving results.

To fully take advantage of the ability to generate extremely lean air fuel mixtures for combustion, the preferred embodiment of valve system includes a mu ti-spark plug arrangement to maximize instantaneous combustion and avoid long flame fronts which produce engine knock, thereby reducing the octane requirement of the fuel. In addition, the proper timing and novel location of the fuel injection nozzle insures that injected fuel is not lost during any overlap of the intake and exhaust valve actuation during scavenging. To accommodate both proper fuel charging of the cylinder and scavenging, the valves are sequentially operated such that the duration of the fuel injection is confined to an air intake charge under control of an intake valve having a delayed actuation such that any scavenging air under the control of the other valve carries no fuel. The preferred embodiments and regimes of operation are described more fully in the detailed description of the embodiments.

BRIEF DESCRIPTION OF THE DRAWINGS

FIG. 1 is a cross section of a view through an engine cylinder and head with multiple valves and an overhead cam actuation system.

FIG. 2 is a schematic illustration partially in cross section of an alternate embodiment with an engine cylinder having a valve and rocker arm assembly FIG. 3 is a schematic illustration of an operating scheme for intake and exhaust cams.

FIG. 4 (a and b) are operating diagrams for air/gas distribution.

FIG. 5 is a schematic illustration of the intake and exhaust valve arrangement with the preferred positioning of the fuel injector and spark ignition systems.

DETAILED DESCRIPTION OF THE PREFERRED EMBODIMENTS

Referring to the cross sectional view of FIG. 1, the head and upper cylinder portion of an engine, designated generally by the reference numeral 10, is shown with two valves of a four valve system 12 in an overhead cam assembly 14. In the valve system 12 shown, an exhaust valve 16 and an intake valve 18 regulate respective exhaust passages 20 and intake passages 22 and their communication with a combustion chamber 24 The engine 10 includes a conventional cylinder block 26 with cooling passages 28 and a cylinder 30 in which a piston 32 reciprocates.

In the overhead cam assembly 14 are a pair of cam shafts 32 and 34 with cams 36 and 38 which actuate the intake and exhaust valves. The valves 16 and 18 each have a valve stem 40 and 42 which are not in direct mechanical contact with the cams of the cam shaft, but have a hydraulic valve lifter assembly 44 with a contact disk 46 contacting the end of the valve stem and a contact disk 48 that contacts the cam of the cam shaft 32 or 34. The contact disks 46 and 48 each have a cylindrical sleeve 50 and 52 with the inner sleeve 50 nestled in the outer sleeve 52 such that a hydraulic chamber 54 is formed between the contact disks 46 and 48. The hydraulic valve lifter assembly 44, is slidable in guide housing 56 in response to actuation by the cams 36 and 38.

A hydraulic fluid passage 58 extends around the outer sleeve 52 and joins the hydraulic chamber 54 through ports 60 and channels 62 in the outer sleeve 50. The fluid passage 58 is connected to a hydraulic supply (not shown) through a supply line 63 having an intermediate slide valve 64. The outer sleeve 50 is biased by compression springs 66 such that contact disk 48 is maintained against cams 36 or 38. Similarly, the exhaust valve and intake valve are biased to a closed position by compression springs 68 and 70 which contact a retainer 72 at the end of the valve stem 40 or 42. So long as a hydraulic pressure in the chamber 54 exceeds the force of the coil springs 68 and 70 the hydraulic valve lifter assembly 44 will move as a unit. If the hydraulic pressure, however, is less then the force of the coil springs at maximum displacement, as a result of controlled bleeding of hydraulic fluid by the slide valve, then the displacement of the exhaust valve 16 or intake valve 18 will be less than maximum displacement.

Controlled bleed of hydraulic fluid from the chamber 54 is accomplished by electronic manipulation of the slide valve 64 by use of an electromagnetic actuator 74 electrically connected to the microprocessor 76. The microprocessor 76 analyzes various engine conditions and operational demands using a state of the art electronic control system having various sensors, for example pressure and temperature sensors 78 at the intake and exhaust passages 20 and 22, and other such sensors as is known for electronic systems management in advanced design engines. With the use of such a microprocessor, the electronically operated slide valve can be actuated to alter the timing and displacement of the intake and exhaust valves within the maximum frame provided by the actuating cams 36 and 38. The position of the valves can be determined by a position indicator or by a pressure sensor 80 that effectively measures the pressure force generated by the dual coil springs 68 and 70 which force is proportional to the displacement of the valve retainers 72. This measurement provides a convenient instantaneous feed back value for use by the microprocessor in confirming that the valves are being positioned in correspondence with the programmed profile for the particular operating conditions encountered.

In addition to controlling the displacement of the valves, the microprocessor 76 controls the ignition of the sparks plugs 82 and the operation of the fuel injector 84 shown in FIG. 5.

In FIG. 5, the preferred arrangement of the valves are shown. Larger intake valves 18 are arranged opposite a smaller exhaust valve 16 with three spark plugs 82 arranged in between for maximized ignition. The intake passages 22 are differently equipped, one passage 22a having a reed valve 86 and the other passage 22b having the fuel injector 84. Use of separate intake passages enables additional control over the air charge and the fuel injection for certain advantageous operations of the system as described hereafter.

Referring now to the embodiment of FIG. 2, a valve assembly designated generally by the reference numeral 100 is shown with a hydraulic valve lifter assembly 102 adapted for use in an engine having a push rod and rocker assembly 104. For purposes of example, a single intake valve 106 is positioned at the top of a cylinder 108 shown in part, with an intake passage 110. The intake valve 106 has a valve stem 112 in a guide 114 with an end retainer 116 which engages a pair of compression springs 118 and 120 for biasing the valve in a closed position. At the end of the valve stem 112 is a contact cap 122 which engages the tappet end of a rocker arm 124 pivotally mounted on support 126. The other end of the rocker arm 124 has a pivotally connected push rod 12B which seats in a socket 138 in displaceable cup 132 that also provides a seat for a compression spring 134 such that the valve lifter assembly 102 is biased against a cam 136 on cam shaft 138. The cam 136 contacts a roller 140 mounted on the end of a displaceable piston 142 having an internal hydraulic fluid chamber 144, biased by a compression spring 146 seated at one end in the piston 142 and contacting at its other end a star mount 148 fixed to the wall of the cylinder 150 in which the piston 142 and cup 132 are displaceable The star mount 148 has a projecting hub 152 for retaining the concentric positioning of the coil spring 146 and for providing a free fluid passage for hydraulic fluid from the hydraulic supply passage 154 to the fluid chamber 144. The supply passage 154 is regulated by a slide valve 156 that is operated by an electromagnetic actuator 158.

In operation, the electromagnetic actuator 158 either blocks the supply passage 154 such that the displacement of the piston 142 from actuation by the cam on the cam roller is fully transmitted to the rocker cup 13 and thereby transmitted through the push rod and rocker assembly 104 to the valve 106. The hydraulic fuel fluid is essentially incompressible such that the valve lifter assembly including the piston 142 and the push rod cup 132 displace as a unit. However, if the slide valve is displaced as shown in FIG. 2 such that hydraulic fluid can freely leave the fluid chamber 144 the displacement of the piston 142 will not be transmitted to the push rod cup 132 leaving the valve 106 in its closed position. Between these two extremes, by appropriate regulation of the release of oil from the chamber, the valve 106 can be displaced at any position between such extremes. The electronic actuator 158 is controlled by a microprocessor 160 that includes sensors as herein described for monitoring engine conditions and is timed in accordance with the rotation of the cam shaft such that variable control of the valve within certain dynamic limitations is achieved. The position of the valve can be monitored by a sensing coil 162 acting in conjunction with a band 164 as shown or by other alternative means such as that previously described.

When equipped with the control valve damping means described, the ability to control engine performance is substantially enhanced. With the engine equipped with the hydraulic valve assembly disclosed, a preferred operating regime can be devised to take advantage of the independently controlled valves in a four-valve per cylinder engine system.

Referring to FIG. 3, a profile of the lobe 170 of a typical exhaust or intake cam 172 on a cam shaft 174 is shown. At any time on the profile of the lobe 170, the electromagnetic valve can be opened to bleed hydraulic fluid such that the effective contour of the lobe is any contour between the parabolic-like contour and the circular shaft contour. Of course, in order that the valve with its inherent inertia dynamically follow the device contour, the contour must be appropriately configured as can be accomplished by opening and closing of the slide valve along exemplar opening O1, O2, O3, etc. and closing the valve along the variable closing C1, C2, C3, etc. By use of a precision bleed valve, not only the timing of the opening, but the quantity of fluid passed can be controlled to achieve the desired peak contour.

Using the hydraulic dampening mechanism, the following absolute operating conditions are easily achievable to the listing, 2 valves; 1 intake and 1 exhaust
3 valves; 2 intakes and 1 exhaust
4 valves; 2 intakes and 2 exhaust In these basic configurations effective torque can be developed in the engine at all operating speeds with the two valve system operable at idle and slow speed the three valve speed operable at slow speeds during acceleration and the four valve system used in high speed operation. Within these ranges for example at a cruise speed the displacement and timing of the four valve system can be dampened to conserve fuel. Furthermore, by closing the intake valves the engine can be used as a breaking system without fuel loss and if desired certain cylinders can be totally deactivated for improved fuel consumption in multi cylinder engines.

Because modern engines with a reduced number of cylinders operate consistently at higher r.p.m. charging air and exhausting combustion gas must be efficiently and rapidly performed in a fraction of the time, required for previous designs. With the additional control provided by the electronically controlled hydraulic valve lifting assembly additional fuel savings can be accomplished by an arrangement as shown in FIG. 5. In FIG. 5 fuel injection is confined to one of the two independent intake passages 22b. The other passage 22a is equipped with a reed valve 86. In this manner the intake valve 42a, controlling intake passage 22a, can be opened in advance of intake valve 42b under such condition one or more of the exhaust valves may not have fully closed such that the small quantity of remaining exhaust gas may be scavenged by use of air that is not charged with fuel. Once the intake stroke is well under way the intake valve 42b can be opened and fuel injection timed to maximize turbulence and mixture of the charge before combustion. The resulting sequential timing of the air intake causes substantial turbulence in the cylinder and effective mixing of fuel and air allowing lean charges to be developed.

Referring to FIG. 4a and FIG. 4b diagrams of the intake and exhaust strokes for a four cycle engine are shown. FIG. 4a schematically defines the variable timing of the first pair of valves with the range:

INTAKE $1 = \pm \alpha° 1.1 + 180° + \neq °1.2 + \text{LIFT (1I)}$;
and,

EXHAUST $1 = \beta° 1.1 + 180° + \beta° 1.2 = \text{LIFT (1E)}$.

FIG. 4b schematically defines the variable timing of the second pair of valves with the range:

INTAKE $2 = \pm \alpha° 2.1 + 180° \alpha° 2.2 + \text{LIFT (2I)}$

EXHAUST $2 = \beta° 2.1 + 180° \beta° 2.2 + \text{LIST (2E)}$

FUEL INJECTION

It is to be understood that in the majority of the compression and power strokes (except for the overlap illustrated) both intake and exhaust valves are closed. The four cycle illustrations in 4a and 4b illustrate the preferred manner of operating the valves within different ranges for optimized performance. The independent timing of each pair of valves is coordinated with the sequence of fuel injection at intake 2. As previously discussed the greater overlap of intake 1 and exhaust 1 allows the initial charge of air to be free of fuel to prevent any fuel-charged air from being exhausted during the inertial vacuum created by high speed exhaust.

The ranges of operation from the maximum cam defined profiles are as follows:

| INTAKE 1 | INTAKE 2 |
|---|---|
| variable opening: $\pm \alpha° 1.1$ | $\pm \alpha° 2.1$ |
| variable closing: $0° \rightarrow \alpha° 1.2$ | $0° \rightarrow \alpha° 2.2$ |
| Total Closing: LIFT (1I) = 0 | LIFT (2I) = 0 |
| EXHAUST 1 | EXHAUST 2 |
| variable opening: $\beta° 1.1 \rightarrow 0°$ | $\beta° 2.1 \rightarrow 0°$ |
| variable closing $0° \rightarrow \beta° 1.2$ | $0° \rightarrow \beta° 2.2$ |
| Total Closing: LIFT (1E) = 0 | LIFT (2E) = 0 |
| VARIABLE OVERLAP 1 | VARIABLE OVERLAP 2 |

-continued

| from ($\alpha° 1.1 + \beta° 1.2) \to 0°$ | from ($\alpha° 2.1 + \beta° 2.2) \to 0°$ |

Fuel injection is electronically restricted to periods outside the overlap process during the angular phase $\gamma°$ with the angle beginning at $\gamma_1 = \beta°_1 + \gamma$ in $\gamma°_1$ which represents the closing of all overlap process.

To insure that the lean charges are properly ignited, multiple spark plugs are provided as shown in FIG. 5 which can be sequentially timed for maximizing ignition and minimizing a long flame front and accompanying engine knock. In such an engine embodiment, the state of the art monitoring and control systems currently applied to ignition and fuel injection can be extended to sequenced spark ignition and sequenced valve operation by the novel spark plug arrangement and valve lifter assembly described. In such a system the effective air charge and emission capacity can be monitored and controlled according to actual operating conditions. This provides a freedom heretofore not available that vastly improves engine performance and fuel efficiency.

While in the foregoing embodiment of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In an internal combustion engine having at least one cylinder with a piston reciprocal therein, and a cylinder head with first and second intake passages and first and second exhaust passages, each intake passage having an intake valve and each exhaust passage having an exhaust valve forming a four-valve per cylinder valve assembly, and, a cam shaft with cams dedicated to operate each intake valve and each exhaust valve in the valve assembly, an improved means for regulating the air charge and combustion gas emission to and from the engine cylinder comprising:

an electro-hydraulic valve lifter assembly for each valve, each lifter assembly including a first contact member mechanically contacting a cam on the cam shaft; a second contact member mechanically contacting a valve, wherein the first and second contact members are separated by a hydraulic chamber filled with hydraulic fluid and are displaceable with respect to one another in accord with the volume of fluid in the hydraulic chamber; valve means to regulate the flow of hydraulic fluid to and from the hydraulic chamber; and, electronic control means for operating each valve lifter assembly independently and controlling the regulation of hydraulic fluid to and from the hydraulic chamber according to engine conditions and operator demand wherein each valve in connection with an electro-hydraulic valve lifter assembly has a period and displacement controlled by the electronic control means wherein the first intake passage has a flow control means for restricting backflow and the second intake passage has fuel injection means for injecting fuel into the intake passage under time control of the electronic control means and wherein the electronic control means has a valve sequence timing regime under which the engine is operated in which the first intake valve in the first passage with at least one exhaust valve being open in part, such that exhaust gases are scavenged with air from the first intake passage without fuel loss.

2. The improved means for regulating the air charge and combustion gas emission of claim 1 including a compression spring in the valve lifter assembly to bias the first contact member against the cam.

3. The improved means for regulating the air charge and combustion gas emission of claim 1 wherein the cylinder head includes a plurality of spark ignition means for each cylinder for improved ignition.

4. The improved means for regulating the air charge and combustion gas emission of claim 3 wherein the spark ignition means is timed by the electronic control means.

5. The improved means for regulating the air charge and combustion gas emission of claim 1 wherein the valve lifter assembly includes a cylindrical guide; the first contact member comprises a contact disc with a cylindrical sleeve reciprocal in the guide; the second contact member comprises a contact disc with a cylindrical sleeve reciprocal in the guide sleeve of the first contact member; and, the hydraulic chamber is formed between the contact discs of the first and second contact members.

6. The improved means for regulating the air charge and combustion gas emission of claim 5 wherein the first contact disc contacts a cam on the cam shaft and the second contact disc contacts a valve.

7. The improved means for regulating the air charge and combustion gas emission of claim 5 wherein the valve lifter assembly includes a compression spring in contact with the sleeve of the first contact disc, the spring being adapted to urge the first contact disc against the cam.

8. The improved means for regulating the air charge and combustion gas emission of claim 7 wherein the sleeve of the first contact disc has openings for passage4 of fluid to the hydraulic chamber.

9. The improved means for regulating the air charge and combustion gas emission of claim 1 wherein the engine includes a rocker arm assembly in contact with each valve and a push rod assembly connected to the rocker arm assembly in contact with the second contact member of a connected valve lifter assembly wherein the second contact member is mechanically contacting the valve through the push rod and rocker arm assemblies.

10. The improved means for regulating the air charge and combustion gas emission of claim 9 wherein the valve lifter assembly includes a cylindrical guide; the first contact member comprises a contact piston in contact with a cam and displaceable in the cylinder in response to rotation of the cam and with the second contact member comprising a cup displaceable in the cylinder opposite the piston, the cup and piston being separated by the hydraulic chamber.

11. The improved mean for regulating the air charge and combustion gas emission of claim 9 wherein the cylinder of the valve lifter assembly includes a piston compression spring and means for positioning the piston compression spring in contact with the piston and biasing the piston against the cam.

12. The improved means for regulating the air charge and combustion gas emission of claim 10 wherein the valve lifter assembly includes a cup compression spring and means for positioning the cup compression spring in contact with the cup and biasing the cup toward the hydraulic chamber.

13. The improved means for regulating the air charge and combustion gas emission of claim 10 wherein the push rod assembly includes an end and the cup has a seat for engagement of the end of the push rod assembly.

14. The improved means for regulating the air charge and combustion gas emission of claim 1 wherein the intake valve of the first intake passage and the exhaust valve of the first exhaust passage are operated with overlapping open valve conditions substantially exceeding the overlapping open valve conditions of the intake valve of the second intake passage and the exhaust valve of the second exhaust passage.

15. The improved means for regulating the air charge and combustion gas emission of claim 1 wherein under certain operating condition of the engine one exhaust valve is maintained in a closed position.

16. The improved means for regulating the air charge and combustion gas emission of claim 1 wherein under certain operating conditions of the engine one exhaust valve and one intake valve is maintained in a closed position.

* * * * *